Dec. 16, 1941.   G. H. WHELDON ET AL   2,266,578
PROCESS OF COLLECTING AND DISPOSING OF STATIC ELECTRICITY
Filed Jan. 25, 1939   2 Sheets-Sheet 1
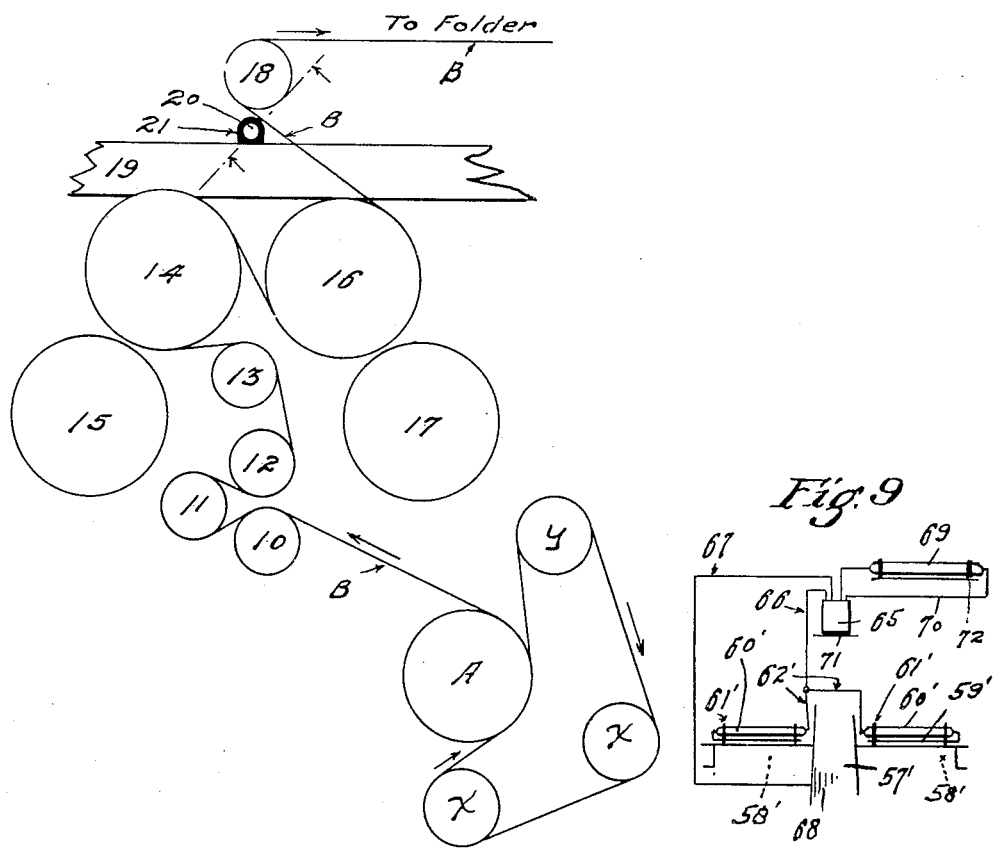
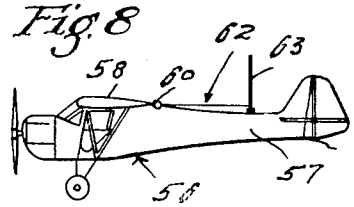
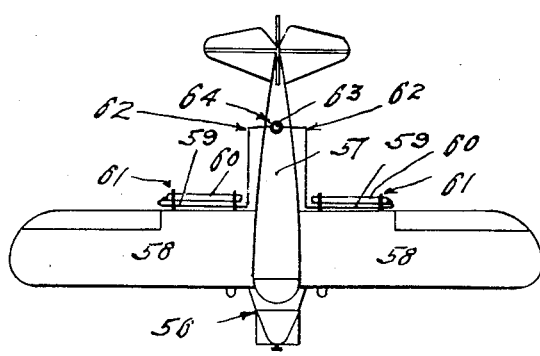
INVENTOR
George H. Wheldon
Herbert A. Lotz
By their Attorneys
Kilgore and Kilgore

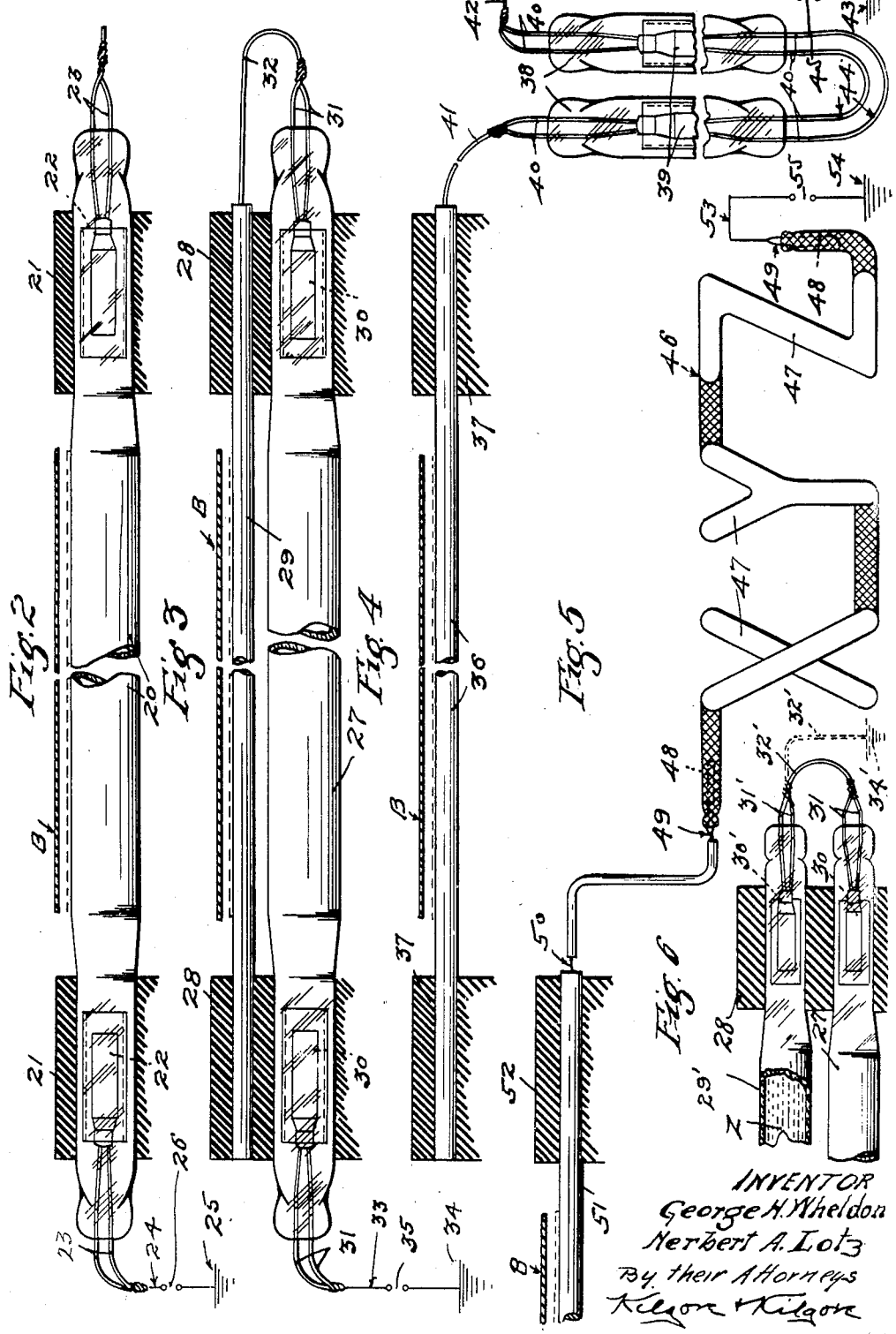

Patented Dec. 16, 1941

2,266,578

UNITED STATES PATENT OFFICE 2,266,578

PROCESS OF COLLECTING AND DISPOSING OF STATIC ELECTRICITY

George H. Wheldon, Brooklyn Township, Hennepin County, and Herbert A. Lotz, Minneapolis, Minn.

Application January 25, 1939, Serial No. 252,782

11 Claims. (Cl. 175—264)

Our invention has for its object to provide an extremely simple and highly efficient process of collecting and disposing of static electricity from objects or machines moving through space; such as an automotive vehicle, a railway train, an aircraft or a marine craft, where static electricity is generated by friction of the whole unit being propelled through the atmosphere. It is well known that certain instruments used in connection with the above group of vehicles, particularly the receiving and sending apparatus of a communicating system and the guidance instruments, such as altimeter, compass and etc., are effected by static electricity to such an extent that the efficiency thereof is materially impaired thereby. There is always a fire hazard where static electricity is being generated, as a spark therefrom, may ignite oil, grease or gasoline which are always present in the above group of vehicles.

Our process of collecting and disposing of static electricity is also equally well adapted for use in connection with a machine, which, as a unit, is stationary but whose movable part or parts, in so doing, generate static electricity. In this group of machines, our process is especially well adapted for use in connection with moving webs or belts and specifically, the paper web or sheet, in a high speed printing press. This is especially true in the case of intaglio printing where highly volatile gas is used in the mixing of the ink. Obviously, it is very necessary to have all fire hazards reduced to a minimum. As static electricity is always present on any kind of a printing press while the same is running, it is essential to the protection of the workmen, building and equipment, that static electricity be collected and disposed of. The removal of static electricity is highly advantageous in contributing to the efficient and safe operation of the equipment.

By the use of our novel process, static electricity is collected and consumed, at least in part, and any excess thereof is carried to a suitable ground or condenser, such as a water pipe, an aerial, a Leyden jar or the like. It may be here stated that we have found by experiment that in some cases, presumably due to the weather or climatic changes, that air dissipates excess static electricity better than a condenser and vice versa.

In carrying out our improved process of collecting and disposing of static electricity, we employ a gas filled tube, such as a neon tube or a tube filled with any of the noble gases such as argon, xenon, and the like. This collector tube may be made of any material that is a good conductor of electricity. But a tube of glass, filled with gas may be used so that the glow, produced by the ionization of the gas, will be visible as an indication that the static electricity is being consumed. This gaseous tube does not necessarily have to have terminals in either end to aid in ionizing the gas in the tube, however in most cases it is advisable.

It is a fact that a gaseous tube, as above mentioned, has an affinity for electrical currents and the higher the voltage the greater the affinity. Static electricity having a high voltage is constantly seeking a change of potential. By the use of a gaseous tube we aid the high voltage static electricity to find its potential and thereby consume it, at least in part, and carry the excess away from its source or vehicle, which in our invention, is any of the above mentioned machines either as a whole, or any unit or part thereof.

Referring to the drawings:

Fig. 1 is a fragmentary view in diagram showing a printing press in side elevation and also showing in part one embodiment of the invention;

Fig. 2 is a fragmentary detail view partly in elevation and partly in section, taken on the line 2—2 of Fig. 1, on an enlarged scale;

Figs. 3, 4 and 5 are views corresponding to Fig. 2 but each showing a slight modification of the invention;

Fig. 6 is a fragmentary view corresponding to Fig. 3, but on a reduced scale, and showing a different type of conductor;

Fig. 7 is a plan view in diagram of an aeroplane showing another embodiment of the invention;

Fig. 8 is a side elevation of the parts shown in Fig. 7; and

Fig. 9 is a wiring diagram showing a slight modification of the invention as shown in Figs. 7 and 8.

The process of carrying out the invention will appear in the description of the structures illustrated in the drawings.

Referring first to the invention illustrated in Figs. 1 to 6 inclusive, which, as shown, is embodied in a paper web printing press, fragmentarily and diagrammatically illustrated. Mounted on the press is a roll A held under tension by a belt X driven from a pulley Y and which belt travels around two directional pulleys Z. The peripheral speed of the pulley Y is slower than the travel of the sheet or web B as the same is unwound from the roll A.

The paper web B after leaving the roll A passes over directional roll 10, thence around the spring roller 11, backwardly and around directional roll 12 and over directional roll 13 to the first impression cylinder 14. As the web B passes between the plate cylinders 14 and 15, the first impression is made upon one side of said web. From the impression cylinder 14, the web B passes under and around the impression cylinder 16. As the web B passes between plate cylinders 16 and 17, the second printing impression is made upon the other side of said web. From the impression cylinder 16 the web B passes over direction roll 18 to the folder, not shown.

The numeral 19 indicates a horizontal side member of one of the side frames of the press and of course there is a member corresponding to the member 19 on the other side frame of the press.

As heretofore stated, our process of collecting and disposing of static electricity generated by a moving object includes a gas filled tube such for instance a neon tube. As shown in Figs. 1 and 2 this collector or gas filled tube is designated by the numeral 20 and extends transversely of the web B in close proximity thereto. Said tube 20 is supported from the side frames of the press by having its end portions mounted in bearings 21 on the frame members 19. These bearings 21 are made of rubber or other suitable insulating material and insulate said tube from the press. The tube 20 is made of a suitable material, preferably glass, and has in one end portion thereof an electrode 22 the terminals 23 of which project outwardly through the respective end of said tube. These terminals 23 are connected by a wire 24 to a condenser or suitable ground 25, such as a water pipe. Interposed in the wire 24 is a spark gap 26.

It may be here stated that it is not necessary to locate the tube 20 between the second impression cylinder 16 and the directional roll 18 over which the web B travels to the folder. However from experiments we have found the greatest amount of static electricity is present at this point. It will of course be understood that the collector for static electricity may be arranged to collect static electricity from any desirable point on the press. For instance, we have collected static electricity from a moving belt contacting the paper web B.

As the collector tube 20 has a greater affinity for electrical currents than the paper web B, static electricity will be attracted to the collector tube 20 and thereby cause the gas in said tube to become ionized causing the collector tube to glow.

If all of the static electricity is not consumed in ionizing the gas in the tube 20, the surplus will pass from the tube 20 to the ground 25, over the wire 24 or into the atmosphere, depending on climatic conditions as heretofore stated.

While in Figs. 1 and 2 the collector tube 20 is shown spaced from the web B, said web in some instances may be in direct contact with said tube as shown by broken lines in Fig. 2.

The spark gap 26, interposed in the wire 24, that connects the terminals 23 to the ground 25, serves as a resistance for the static electricity until sufficient or greater voltage has been built up as to cause a spark to jump across the points of the spark gap. This built up voltage causes the tube 20, to glow with greater brilliance due to a greater electrical force lighting the tube. The time it takes this additional voltage to build up is momentary, and although it causes a slight flicker in the tube, it does not create any objectional features in static collecting and disposal, but brightens the illumination of a design formed by the tube or plurality of tubes as shown in Fig. 5. The glow of the tube 20 caused by ionization of the gas in said tube is an indication to the operator of the press that static electricity, generated by the moving web B is being consumed.

Referring now to the invention as shown in Fig. 3; the gas filled tube 27 is mounted in bearings 28 similar to the bearings 21. In place of placing the tube 27 in close proximity to the paper web B, as shown in Fig. 2, said tube is spaced therefrom and a collector bar 29 placed in close proximity thereto. This collector bar 29 has its end portions mounted in the bearings 21, and is made of a material that is a good conductor of electricity. In each end of the tube 27 is an electrode 30, the terminals 31 of which, project outwardly through the ends of said tube. A wire 32 connects one end of the collector bar 29 to one pair of the terminals 31 and a wire 33 connects the other pair of said terminals to a ground 34. Interposed in the wire 33 is a spark gap 35.

In Fig. 4 the collector bar 36 corresponds to the collector bar 29 as to the mounting thereof in bearings 37 and the position thereof relative to the web B, but in place of mounting a gas filled tube on the press frame we provide a plurality of gas filled tubes 38, as shown, two, and locate the same at a distant point from the press. Each of these tubes 38 has in each end, an electrode 39, not all of which is shown, and the terminals 40, thereof, extend outwardly through the respective ends of said tubes. A wire 41 connects the conductor bar 36, at one end, to the terminals 40 in one of the tubes 38 and a wire 42 connects one of the terminals 40 in the other tubes 38 to a ground 43. The other terminals 40 are connected in series as indicated at 44. Interposed in the wire 42 is a spark gap 45.

The embodiment of the invention as shown in Fig. 5 corresponds to that shown in Fig. 4 except, in place of a plurality of gas filled tubes, a single tube 46 is bent to form a plurality of letters of the alphabet, designated by the numeral 47. In each end of the tube 46 is an electrode 48, the terminals of which are designated by the numeral 49. A wire 50 connects one pair of the terminals 49 to one end of a collector 51 mounted in bearings 52 and arranged, relative to the web B similar to the collector bar 36. The other pair of terminals 49 is connected by a wire 53 to a ground 54. A spark gap 55 is interposed in the wire 53. In place of the letters 47 the tube 46 may be bent to form a design, numerals, sign or the like.

It is evident that a multiplicity of collector tubes may be used and will consume a large amount of static electricity in the ionizing of the gas in the tubes, and any remaining static electricity may be dissipated through a suitable condenser.

The invention illustrated in Fig. 6 is the same as that shown in Fig. 3 with the exception of the collector. Like parts in Figs. 3 and 6 are given the same reference numerals as said parts in Fig. 3. In this illustration of the invention the collector is a tube 29' made of a material that is a good conductor of electricity and filled with an electrolytic solution Z. The terminals 31' of the electrode 30' are connected to the terminals 31 of the electrode 30 by a wire 32'.

In some instances it might be desirable to connect the terminals 31' by the wire 32' directly to a ground 34' as shown by broken lines in Fig. 6, in place of connecting the same to the terminals 31, and in which case the gas filled tube 27 will be dispensed with and the static electricity collected by the tube 29' will be carried directly to the ground 34'.

The invention, as shown in Figs. 7 and 8 is constructed and arranged for the collecting and disposing of static electricity generated and produced by friction on the body of an aeroplane moving through the atmosphere. The aeroplane illustrated is designated as an entirety, by the numeral 56 with the exception of the fuselage 57 and the wings 58. The embodiment of the invention in the aeroplane 56 is substantially the same as that shown in Fig. 3, wherein there is a collector bar and a gas filled tube 60 employed for each side of the wing 58. Each tube 60 and its collector bar 59 is attached to the respective side of the wing 58 by means of bearings 61, formed of rubber or other suitable insulating material, with said bar in close proximity to the trailing edge of said wing. The collector bars 59, at one of their ends are connected to the terminals in one of the ends of the tube 60 and the terminals thereof are connected by wires 62 to an aerial 63 secured to the fuselage 57 and insulated therefrom, as indicated at 64.

In the diagram illustrated in Fig. 9, the fuselage, the wings, the collector bar, the tube and the wires are designated by the same numerals as the corresponding parts shown in Figs. 7 and 8 except a prime (') has been added thereto. In place of the aerial 63 as a condenser, we use in place thereof, a Leyden jar to one of the contacts of which the wires 62' are connected by a single branch wire 66. A wire 67 connects another contact of the Leyden jar 65 to the aeroplane 56 as a ground, designated by the numeral 68. As one means of consuming or disposing of surplus static electricity from the tubes 60 we provide a gas filled tube 69 having a large gas holding capacity, materially greater than that of the tubes 60. The terminals of the tube 69 are connected by wires to contacts on the Leyden jar 65. Both the Leyden jar and the tube 69 are mounted on the aeroplane 56 and insulated therefrom as indicated by the numerals 71 and 72 respectively.

It may be here stated that the word "condenser" is herein used in a broad sense to cover any means for dissipating static electricity, such as a ground, for instance, a connection leading to a water pipe or the like, an aerial, or a Leyden jar.

It will be understood that the invention described is capable of various modifications within the scope of the invention herein disclosed and claimed.

What we claim is:

1. The process of collecting and disposing of static electricity generated by a moving object, consisting in providing a gas filled tube made of a material that is a non-conductor of electricity, and in placing this tube in juxtaposition to said object to collect static electricity therefrom and consume the same by ionizing the gas in said tube.

2. The process of collecting and disposing of static electricity generated by a moving web or belt, consisting in providing a gas filled tube made of a material that is a non-conductor of electricity, and in placing said tube in juxtaposition to said web or belt to collect static electricity therefrom and consume the same by ionizing the gas in said tube.

3. The process of collecting and disposing of static electricity generated by a moving web or belt, consisting in providing a gas filled tube made of a material that is a non-conductor of electricity, and in placing said tube in direct contact with the web or belt to collect static electricity therefrom and consume the same by ionizing the gas in said tube.

4. The process of collecting and disposing of static electricity generated by the moving paper web of a printing press, consisting in providing a gas filled tube made of a material that is a non-conductor of electricity, in mounting said tube on the frame of the press, insulating the same therefrom and in juxtaposition to said web to collect static electricity therefrom and consume the same by ionizing the gas in said tube.

5. The process of collecting and disposing of static electricity generated by a moving object, consisting in providing a gas filled tube having therein an electrode the terminals of which project outwardly through said tube, in placing the tube in juxtaposition to said object, and in further providing a condenser and connection from said terminals to the condenser.

6. The process defined in claim 5 in further providing a spark gap in the connection.

7. The process of collecting and disposing of static electricity generated by a moving web or belt, consisting in providing a gas filled tube for collecting and consuming static electricity by ionizing the gas therein, said tube having therein an electrode the terminals of which project outwardly through the tube and in placing the tube in juxtaposition to the web or belt, in further providing a condenser for dissipating static electricity collected by said tube, and a connection from said terminals to the condenser.

8. The process defined in claim 7 still further providing a spark gap in the connection.

9. The process of collecting and disposing of static electricity generated by a moving web or belt, consisting in providing a gas filled tube for collecting and consuming static electricity by ionizing the gas therein, said tube having therein an electrode the terminals of which project outwardly through the tube, in placing the tube in direct contact with the web, in further providing a condenser for dissipating static electricity collected by said tube, and a connection from said terminals to the condenser.

10. The process of collecting and disposing of static electricity generated by the moving paper web in a printing press, consisting in providing a gas filled tube for collecting and consuming static electricity by ionizing the gas therein, insulating the same from the press and in juxtaposition to the paper web, said tube having an electrode the terminals of which project outwardly through the tube, in further providing a condenser for dissipating static electricity collected by said tube, and a connection from said terminals to the condenser.

11. The process of collecting and disposing of static electricity generated by the moving paper web in a printing press, consisting in providing a gas filled tube for collecting and consuming static electricity by ionizing the gas therein, insulating the same from the press and in direct contact with the paper web, said tube having an electrode the terminals of which project outwardly through the tube, in further providing a condenser for dissipating static electricity collected by said tube, and a connection from said terminals to the condenser.

GEORGE H. WHELDON.
HERBERT A. LOTZ.